Sept. 26, 1950

A. D. LUND 2,523,910

STORAGE BATTERY PLATE AND SEPARATOR ASSEMBLING MACHINE

Filed Nov. 30, 1945

INVENTOR.
ARTHUR D. LUND
BY
Carlsen & Hasle
ATTORNEYS

Sept. 26, 1950 A. D. LUND 2,523,910
STORAGE BATTERY PLATE AND SEPARATOR ASSEMBLING MACHINE
Filed Nov. 30, 1945 7 Sheets-Sheet 3

INVENTOR.
ARTHUR D. LUND
BY
Carlsen & Hayes
ATTORNEYS

Sept. 26, 1950     A. D. LUND     2,523,910
STORAGE BATTERY PLATE AND SEPARATOR ASSEMBLING MACHINE
Filed Nov. 30, 1945     7 Sheets-Sheet 7

FIG 17

Inventor
ARTHUR D. LUND
By Carlsen + Hayb
Attorneys

Patented Sept. 26, 1950

2,523,910

UNITED STATES PATENT OFFICE 2,523,910

STORAGE BATTERY PLATE AND SEPARATOR ASSEMBLING MACHINE

Arthur D. Lund, Minneapolis, Minn., assignor to Solar Corporation, Milwaukee, Wis., a corporation of Delaware Application November 30, 1945, Serial No. 631,991

23 Claims. (Cl. 214—6)

This invention relates to machines for assembling the positive and negative plates and separators used in storage batteries.

In the battery making process the respective positive and negative plates and separators therefor must be grouped in proper order and this operation has largely heretofore been carried out by hand. The manual assembly of the plates and separators is, however, an expensive and inaccurate way in which to accomplish the work, and in order to eliminate hand work as far as possible and to obtain machine precision and speed in production, I have previously designed a machine for the purpose, as disclosed in my prior U. S. Patent No. 2,324,523 for Machine for Assembling Storage Battery Plates and Separators, issued July 20, 1943.

It is the primary object of my present invention to provide useful improvements over the machine disclosed in that patent. Basically my machines in both instances include a series of supply stations each with means for supporting stacks of the plates and separators, a series of collecting or receiving units adapted to move in succession past the stacks, and means for transferring the plates and separators in proper order and sequence from the stacks to said collecting units so that groups of plates and separators will be rapidly and accurately accumulated, ready for removal from the machine and subsequent operations of assembly into the batteries. My present invention contemplates, as one improvement over my prior machine, a transfer mechanism by which plates and separators of any thickness may be accurately removed or stripped from the stacks and transferred to the receiving units. In my prior machine the plates were stripped from the bottoms of the stacks and some difficulty was noted in stripping the very thin plates and separators used in some cases. My present invention contemplates the removal of the plates and separators from the tops of the stacks by suction devices so that the thickness of the parts has no bearing on the effective operation.

Another object of this invention is to provide means or mechanism to insure the maximum accuracy in stacking the plates and separators as they are assembled, to the end that the component plates and separators will have the proper relative positions and the final assembly operations will thus be facilitated.

Another object is to provide a machine having adequate and convenient adjustments for plates and separators of different thicknesses so that the machine may be readily set up and adjusted for operation upon parts of any sizes and thicknesses usually encountered.

A further object is to provide a machine having multiple safety features designed to protect the machine against malfunctions of any kind which may be reasonably expected in its operation.

Still a further object is to provide a machine of this character and for this purpose having various improvements and features looking to trouble free, accurate and rapid operation at all times.

These and other more detailed and specific objects will be disclosed in the course of the following specification, reference being had to the accompanying drawings, in which:

As pointed out in detail in my prior patent a storage battery cell pate assembly comprises a series of positive and negative grid plates alternately arranged in series, and with each two adjacent plates separated by an insulating sheet, commonly known as a separator. The positive plate side of each separator is ribbed to form spaces for the circulation of the electrolyte about the plate and its follows, therefore, that the separators must have their face surfaces reversed as they are assembled in order to always present their ribbed surfaces to the positive plates.

Figure 11:
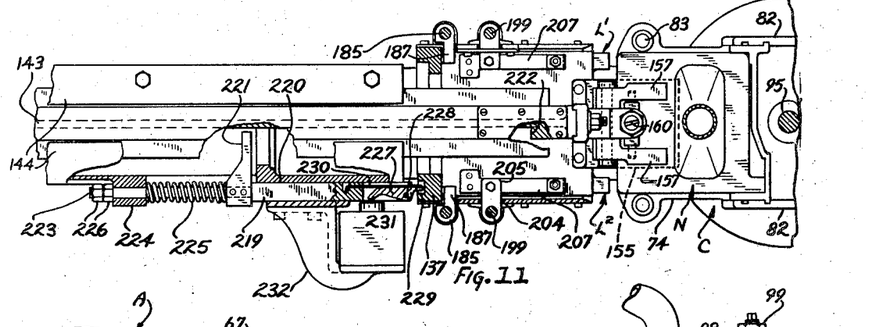
Fig. 11 is a plan view of one receiving unit and associated parts showing a plate in the process of being transferred.

In practice, a series or group of plates and separators thus interleaved are assembled and held together by straps (not shown) "burned" to and connecting the lugs on the plates. Throughout the drawing herein the positive plates are indicated at P, the negative plates at N and the separators at S. The lugs upon the positive plates are designated $L^1$ and those upon the negative plates at $L^2$ and it will be noted (Figs. 11, 12 and 13) that the respective lugs extend from opposite corners of the plates to facilitate their connection by the negative and positive straps. It may further be noted at this point that the height or length of the separators S is greater than the corresponding dimension of the plates P and N, or the main body portions thereof ignoring their lugs, so that in the completed assembly and with the assembly resting upon the bottom of the battery casing, the separators will project evenly a distance above the upper edges of the plates. This is a desired position and condition for reasons which need no explanation herein. However, as the groups or stacks of plates and separators are formed by operation of my machine, the separators S are positioned with edge portions projecting beyond what will be the lower edges of the plates P and N, and are removed from the machine in such condition. The resulting arrangement is made clear in Figs. 12 and 13, and the purpose is to space the separators from the lugs $L^1$ and $L^2$ while the same are being "burned" to their straps. After this operation the separators are then pushed upwardly to proper positions by merely resting the assembly on a flat surface, or inserting it into the battery.

In general the machine of my present invention is similar in many respects to that of my prior patent and it includes a centrally located, intermittently or step by step revolving turret designated generally at A, a series of stationary frames B arranged about the turret, a series of supply stations C around the turret, supported by the frames B, and a series of collecting or receiving units D carried by the turret A and movable thereby successively from one station C to the next around the entire series. Fundamentally the operation of this machine is also like that of my prior patent, the stations C being alternately and successively filled with stacks of positive plates P, separators S, negative plates N, and again separators, and so on around the entire machine; and the collecting units being each positioned momentarily in receiving position adjacent each supply station in succession, while a plate or separator, as the case may be, is transferred from the station to the receiving unit. Thus, after each receiving unit has passed all of the stations, it will have received in proper order and sequence the negative and positive plates and separators to assemble a group or plate assembly, the maximum size of which, as regards the number of plates, will be determined by the number of stations aranged about the turret. For forming groups having smaller numbers of plates some of the stations C will be left idle, as will be readily apparent.

Turning now to a more detailed description of my present machine, it comprises a heavy base casting or base 20 having a dished center 21 surrounded by an annular rim or ledge 22. The frames B are secured in evenly spaced relation by bolts 23, upon this rim 22 and extend radially outward therefrom and these frames carry the supply stations C in a circular row about the turret. The base 20 further supports a heavy tubular standard or center post 24 which is rigidly secured to the dished center of the base by bolts 25. Upon this standard there are slidably mounted two superimposed, independently vertically movable, annular frames or hubs 26 and 27. These hubs are prevented from rotating by slidably fitting them at 28 over at least one upright post 29 secured in a socket 30 on the base.

The respective annular, peripheral flanges 31 and 32 of the hubs 26 and 27 carry circumferentially spaced bearing brackets 33 and 34 each series of which is equal in number to the number of supply stations on the machine. The bearing brackets 33 on the upper hub 26 support pivot pins 35 carried by the inwardly directed ends of bell-crank levers which operate the plate transfer mechanisms later to be described, said levers being, as shown, fulcrumed at 37 upon the frames B. Similarly the bearing brackets 34 on the lower hub 27 carry pins 38 connected to the inner ends of walking beam levers 39 which actuate the plate stripping or removing mechanism at each supply station, also as will be later described. The levers 39 are fulcrumed at 40 on the frames B. This arrangement is obviously such that up and down movements of the hubs 26 and 27 will result in oscillating movements of the respective levers 36 and 39 in radially and vertically extending planes with respect to the center of the machine.

Figure 17:
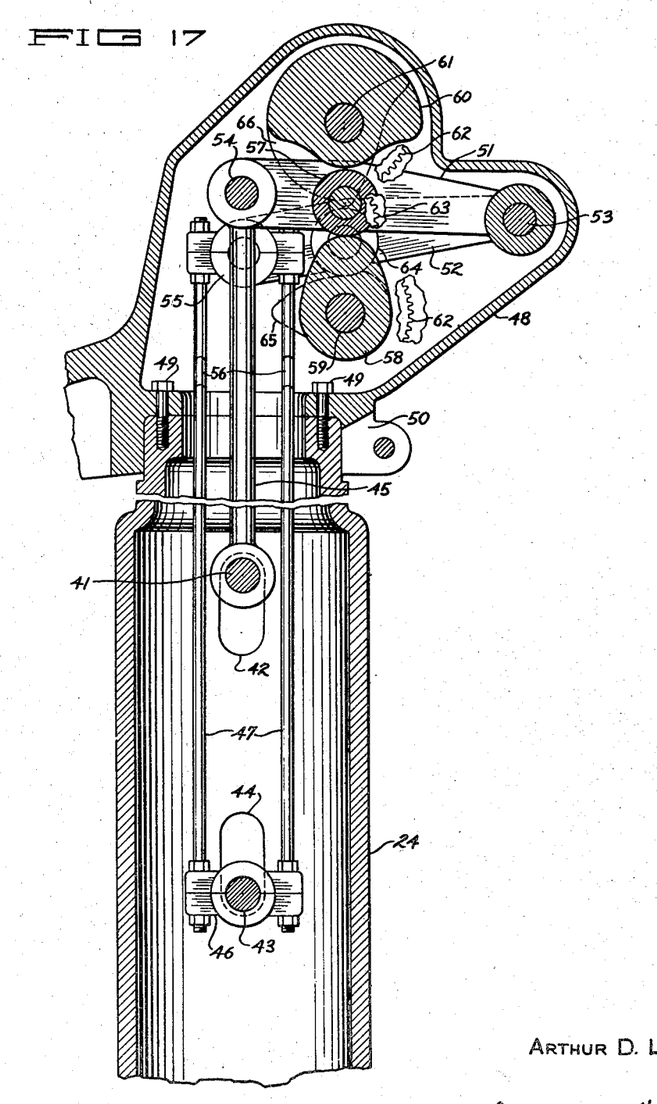
Fig. 17 is an enlarged detail, vertical sectional view of the mechanism of the upper left hand portion of Fig. 1, and showing cam actuating means for certain parts of the machine.

The hubs 26 and 27 are reciprocated vertically and in timed relation to each other by mechanism which is similar to that in my prior machine and which will now be described. The upper hub 26 has affixed thereto a diametrically extending pin 41 which penetrates the standard 24 and plays in vertical slots 42 in the walls thereof. The lower hub 27 likewise carries a pin 43 playing in slots 44. The lower end of a connecting rod 45 is attached to the upper pin 41 and extends upwardly therefrom (Fig. 17) while the lower pin 43 has connected thereto, by a bearing block 46, the lower end of a connecting yoke which comprises two rods 47 spaced apart a sufficient distance to clear the upper pin and its connecting rod. A housing 48 is supported by cap screws 49 and a clamp 50 atop the standard 24 and the rods 45 and 47 extend upwardly into the interior of this housing. Within housing 48 a pair of cam levers 51 and 52 are pivoted upon a common shaft 53 and the connecting rod 45 is pivotally attached at 54 to the free end of the lever 51 while the rods 47 are pivotally connected by a bearing block 55 to the corresponding end of the other lever 52. The rods 47 are offset as indicated at 56 to clear the rod 45 and its associated lever.

The lever 51 has a roller 57 intermediate its ends and operating thereunder is a lifter cam 58 upon a cam shaft 59 journaled in and through the housing 48. A follower cam 60 operates above the roller 57 upon another cam shaft 61, parallel with the first. In exactly the same manner as shown and described in detail in my prior patent the cam shafts 59 and 61 are synchronously motor driven and rotated by gears 62 upon exposed ends of the shafts, and a pinion 63 meshing with the two gears. Obviously, the lower cam 58 will operate to periodically lift the lever 51, connecting rod 45 and hub 26 and then lower it, while the follower cam 60 provides a positive downward restoring motion for the parts.

The other lever 52 also carries a cam roller 64 beneath which operates another lifter cam 65 on the shaft 59. Another follower cam 66 upon shaft 61 also cooperates with this roller 64. The action is thus the same upon lever 52, rods 47 and lower hub 27 and the timed relation of the movements of the two hubs, due to the shape of the respective cams as here shown, will be later pointed out.

The main turret A, per se, comprises a round cast plate 67 which is journaled by bearings 68 upon the standard to rotate thereabout in a horizontal plane. This plate 67 is rotated in exactly the same manner as was the turret plate of my prior patent and since this feature forms no part of my present invention no further description is believed to be necessary herein, it being sufficient to note that plate 67 is rotated intermittently, in a step by step fashion, synchronously with other operations which will be detailed hereinafter.

The plate receiving or collecting units D are secured to and around the peripheral edge of the turret plate 67 by means of cap screws 69. The details of construction of these units will follow but it is here noted that at one of such units there is provided a pair of outwardly and downwardly projecting hanger or bracket arms 70, mounted by cap screws 71 (Fig. 10) to the plate edge and which at their lower ends carry mechanism designated generally at 73, cooperating with the stations C, also as will later appear. The arms 70 extend downwardly at each side of the collecting unit D and depend therebelow some distance so that they in no way interfere with the transfer of plates to that unit.

The supply stations C are mounted at the outer ends of the frames B and this construction will now be described, it being understood that all of such station assemblies, with but one minor difference, are identical. Each station is designed to contain a stack of negative or positive plates or separators, as the case may be, in position for transfer to the collecting units D as they pass, and also includes a place for a second stack which may be stacked by the operator and will then be turned about in position for transfer while the depleted first stack is being restocked. The stations are thus intermittently rotatable to and between two positions, and operated in turret fashion.

Each station C thus comprises a rectangular turret base plate 74 of a length somewhat greater than necessary to accommodate two stacks of plates or separators and this plate is secured atop a tubular turret stem or shaft 75 which is journaled in and supported in an upright position by antifriction bearings 76. These bearings 76 (Fig. 4) are placed in the cylindrical upper end 77 of a casting 78 secured by screws 79 atop the hollow and partially round outer end 80 of the frame B, and below the bearings the stem 75 carries a gear 81 which rotates with the stem and turret base plate 74.

Figure 7:
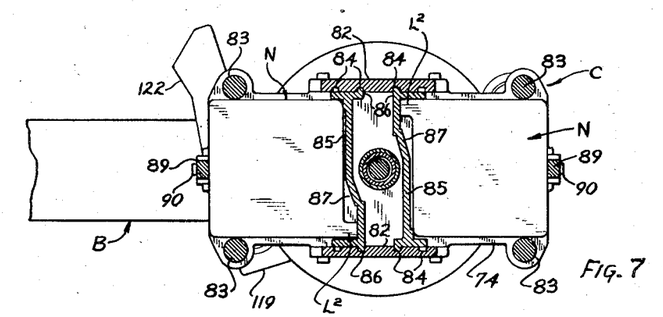
Fig. 7 is an enlarged horizontal sectional view along line 7—7 in Fig. 4.

The plate 74 has side members 82 at its center and spaced therefrom has upstanding corner posts 83. The inner surfaces of the side members 82 have spaced pairs of vertical grooves 84 and end or back plates 85 each having a corresponding vertical rib 86 at each side adapted to be slipped down into these grooves. The end plates 85 are offset adjacent opposite sides as indicated at 87 thus providing spaces (Fig. 7) to accommodate the lugs on the battery plates. The end plates may be removed and flopped over or reversed to place the offsets 87 at either side to accommodate the lugs on either positive or negative plates, and are shown as reversed for this purpose in Fig. 2. Also shown in Fig. 2 the offset end plates 85 may be replaced, at each station carrying the separators S, with straight plates, indicated at 88, the edges of which fit one groove of each pair 84. In stacking either plates or separators they are placed with their intended upper edges straight against the end plates 85 and the posts 83 act to confine the plates, or separators against lateral displacement. Obviously the end plates 85 may be positioned in either groove 84 of each pair to vary their position with respect to the ends of the base plate 74 and the posts 83 may be replaced with others of different sizes, to thus accommodate plates of different shapes and sizes and much latitude of adjustment is possible.

Figure 12:
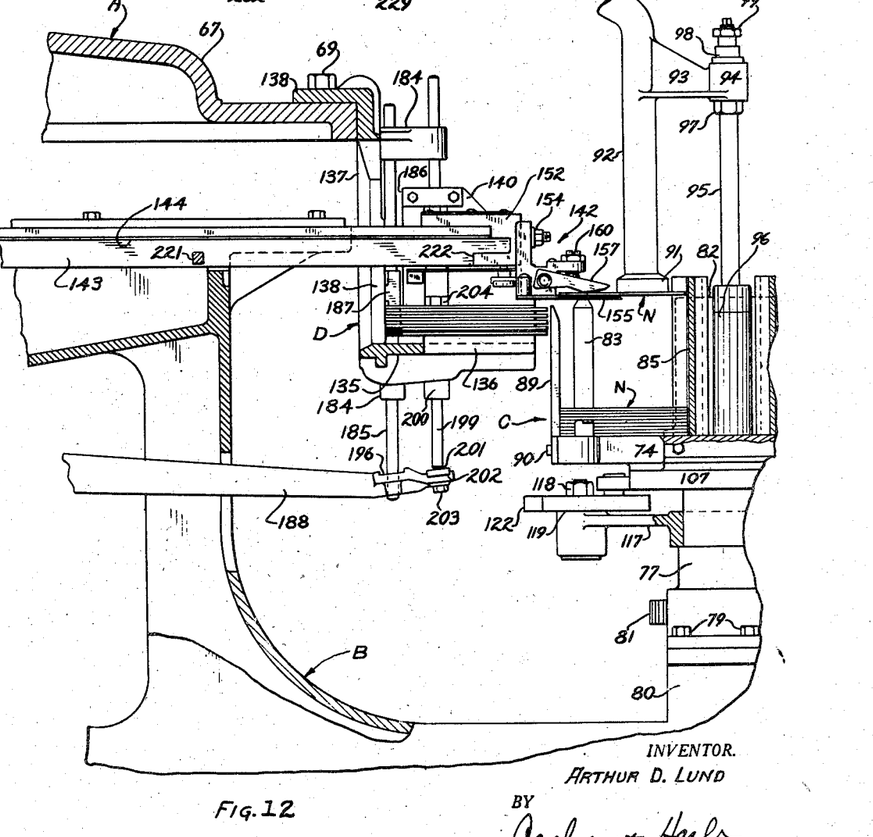
Fig. 12 is a side elevation, partially in section, of the apparatus in Fig. 11.

As clearly apparent in Fig. 12, the end plates 85 are higher than the posts 83. There are also provided at the ends of the turret base plate 74 upright retaining fingers or base 89 secured to plate 74 by screws 90, and these fingers serve to prevent the plates, or separators, from moving away from the end plates 85 and so maintain the plates in an even, straight stack. These fingers 89 are shorter than the posts 83 for a purpose presently to appear.

The back plates 85, posts 83 and fingers 89 form two separate hoppers or magazines at each supply station to accommodate two separate stacks of plates or separators, as will be understood.

Plates, or separators, are lifted from the stack, at each station, nearest the turret A, by means of a suction head 91 which is supported above the inner hopper and is vertically movable with respect thereto. Said suction head 91 is formed at the lower end of a tube 92 having a bracket arm 93 which terminates in a collar 94. A lifter rod or shaft 95 is slidably mounted up through the tubular stem 75 of the base plate 74, through also a guide sleeve 96 secured to and upwardly extending from this plate, and the upper end of this rod receives the collar 94. A stop nut 97 is threaded down on the lifter rod below the collar 94 and positioned thereabove is a washer 98 topped by a clamp nut 99 which locks the collar on the rod. Thus by raising and lowering the lifter rod 95 the suction head 91 may be correspondingly moved.

The rod 95 is raised and lowered by the walking beam lever 39, the outer end of which extends out beneath the rod and carries a roller 100 adapted to upwardly engage the lower end of the rod. The rod 95 is locked against turning movement by a guide finger 101 clamped at 102 near its lower end and extending radially therefrom out through a vertical slot 103 in one side of the rounded end 80 of the frame B. Vertical, spaced guide bars 104 are secured to brackets 105 on said frame and the flattened extremity 106 of the finger 101 may play up and down between these guide bars as the rod 95 is raised and lowered but the bars hold the rod from any turning movement whatever. Thus the suction head 91 cannot swing about and will maintain its proper position over the inner stack of plates, or separators, at all times. The suction head 91 may descend at the limit of its downward movement almost to the top surface of the base plate 74 and will ascend to a point above the level of the end plates 85 to clear them as the turret base plate 74 is rotated.

Figure 8:
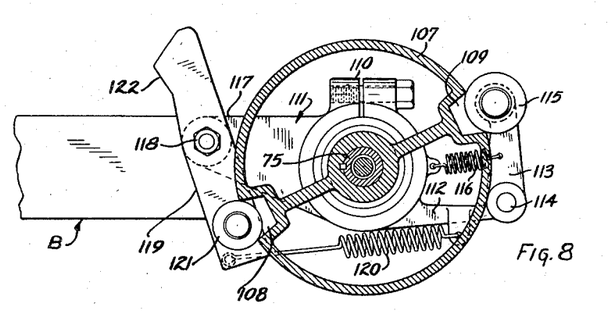
Fig. 8 is a similar view along the line 8—8 in Fig. 4.
Figures 9, 10:
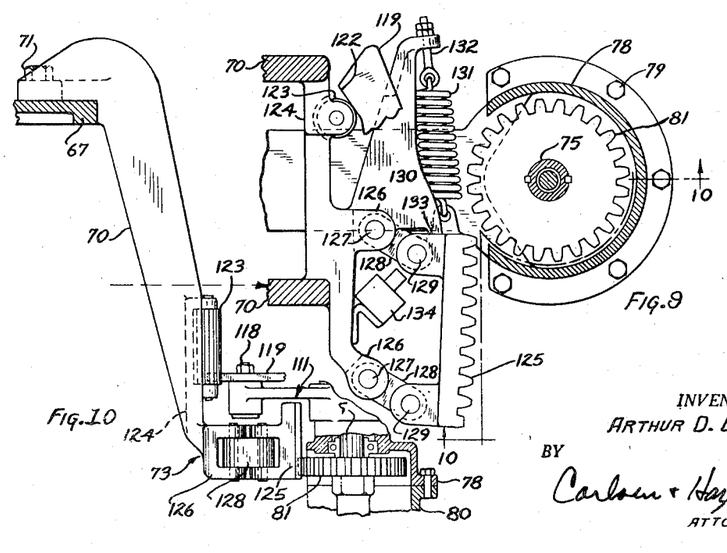
Fig. 9 is a similar view along the line 9—9 in Fig. 4.
Fig. 10 is a view substantially along the line 10—10 in Fig. 9 and on a slightly reduced scale.

Referring now particularly to Figs. 8-10, the rotating or positioning means for the turret base plate 74 of each station will be described. This plate has a cylindrical, downward extension, locking member or turret neck 107 concentric with the vertical axis about which the plate turns, and this locking member has two diametrically opposed notches 108 and 109. Positioned below the locking member 107 and clamped at 110 rigidly upon the cylindrical neck 77 of the casting 78 is a supporting plate 111 from one side of which there is an arm 112 outwardly extended beyond the periphery of member 107. An indexing or retaining lever 113 is pivoted at one end at 114 to the extremity of the arm 112 to swing at its other end toward and away from the periphery of member 107 and this free end of the lever 113 carries an index roller 115. This roller 115 is adapted to partially enter either of the notches 108 and 109 to be held normally therein by a retractile coil spring 116 which biases the lever 113 in the proper direction. The arrangement is such that roller 115 will thus hold the plate 74 in either of two positions, depending upon the notch 108 or 109 which is engaged with the roller, and will so hold the plate against anything but a forceful rotary movement applied to the plate. In other words the base plate 74 may be rotated if power is applied for the purpose sufficient to unseat the roller 115 from either notch.

The plate 111 also has an oppositely extending arm 117 to which, beyond the periphery of the locking member 107, there is fulcrumed at 118 a latch bar 119. One end of the latch bar 119 is biased toward the member 107 by another retractile coil spring 120 and this end of the bar carries a retaining roller 121. Said roller 121 is smaller in diameter than the index roller 115, is adapted to penetrate either notch 108 or 109 deeper, and therefore locks member 107, and bar plate 74, against rotary movement, except when the latch bar is swung to clear the roller 121 from the notch. The end of the latch bar opposite its roller has an angular cam surface 122.

Cooperating with the latch bar 119 is a cam or releasing roller 123 which is carried by a cross bar 124 joining the hanger arms 70 hereinbefore described. This roller 123 is so supported that, as it is carried, by the rotation of the turret A to which arms 70 are connected, past each station, it will engage the cam surface 122 and by swinging the latch bar 119 will clear the roller 121 from the notch 108 or 109 in the locking member 107 thus unlocking same, except for the index roller 115.

Also carried by the arms 70, at a lower elevation than the roller 123 is a segmental, slightly arcuate gear rack 125 which, in operation, engages the gear 81 and turns it through exactly a half turn each time the mechanism 73 passes a station. In practice, this half-revolution movement of the gear 81, which of course results in a corresponding turret movement of the locking member 107 and turret base plate 74, is initiated just as the roller 123 actuates latch bar 119 and unlocks member 107, and the force exerted by meshing of the rack 125 and gear 81 then releases the index roller 115 so that the parts may turn. The rack 125 thus is behind, or trails the roller 123, with reference to the direction of rotation of the turret, and the rack further is curved on a radius centered about the rotary axis of the turret.

To support the rack 125 the cross bar 124 has spaced bearing ears 126 and to these are pivoted at 127, a pair of short links 128. The outer ends of these links 128 are similarly pivoted at 129 to lugs on the inside and at the ends of the rack. A spring supporting arm 130 is rigidly extended from one ear 126 and a retractile coil spring 131 is stretched between an adjustment screw 132 in this arm and one end of the rack. This spring 131 normally holds the rack 125 in one position, against a stop 133, but will permit the rack to swing back, with respect to the direction in which it is carried by the turret A, upon the links 128. The purpose of this release movement is to prevent damage to the parts should the rack fail for any reason to properly mesh with the gear 81, or the parts become locked in any other way. If this should occur, the rack will swing back a short distance as the turret travels on ahead and arranged in the path of one of the links 128 or other part of the rack is an electric switch 134 which will be actuated by such movement of the rack. This switch may be wired in the circuit (not shown) to the motor powering the turret A and when thus actuated by movement of the rack, will shut off the motor to stop the machine until the trouble can be corrected. A protective circuit is shown in my prior patent and since it is believed to be obvious how the switch 134 may be connected to properly control the motor, no specific circuit connections are shown herein.

It will, of course, be understood that the spring 131 will be heavy enough to hold the rack 125 in position for turning the turret parts at each supply station, as long as they are in proper working order.

Attention is called to the width of the rack 125 vertically with respect to the gears 81 and of the roller 123 with respect to the latch 119, as shown in Fig. 10. The purpose of this wide face on both rack and roller will presently be made clear.

The plate collecting or receiving units D each comprise a shelf or bottom 135 having an opening 136 toward the stations C so that the undersides of a group of plates may be readily grasped in removing them from the shelf. The shelf 135 continues upwardly from its rear or inner end in a vertical back wall 137 which terminates at its upper edge in an inwardly turned flange 138 through which pass the screws 69 which mount the collecting units on turret plate 67. The back wall 137 is also cut out centrally, as at 139, forming an opening through which the picker or transfer mechanism may pass as will be pointed out. Extending upwardly from the sides of the shelf 135 are side walls 140 secured to the shelf edges by screws 141 and thus is formed a receptacle in which the plates may be evenly stacked, said receptacle being open at the front or outwardly toward the stations C to receive plates therefrom and being open at the top for removing accumulated plate groups.

Figures 4, 5, 6:
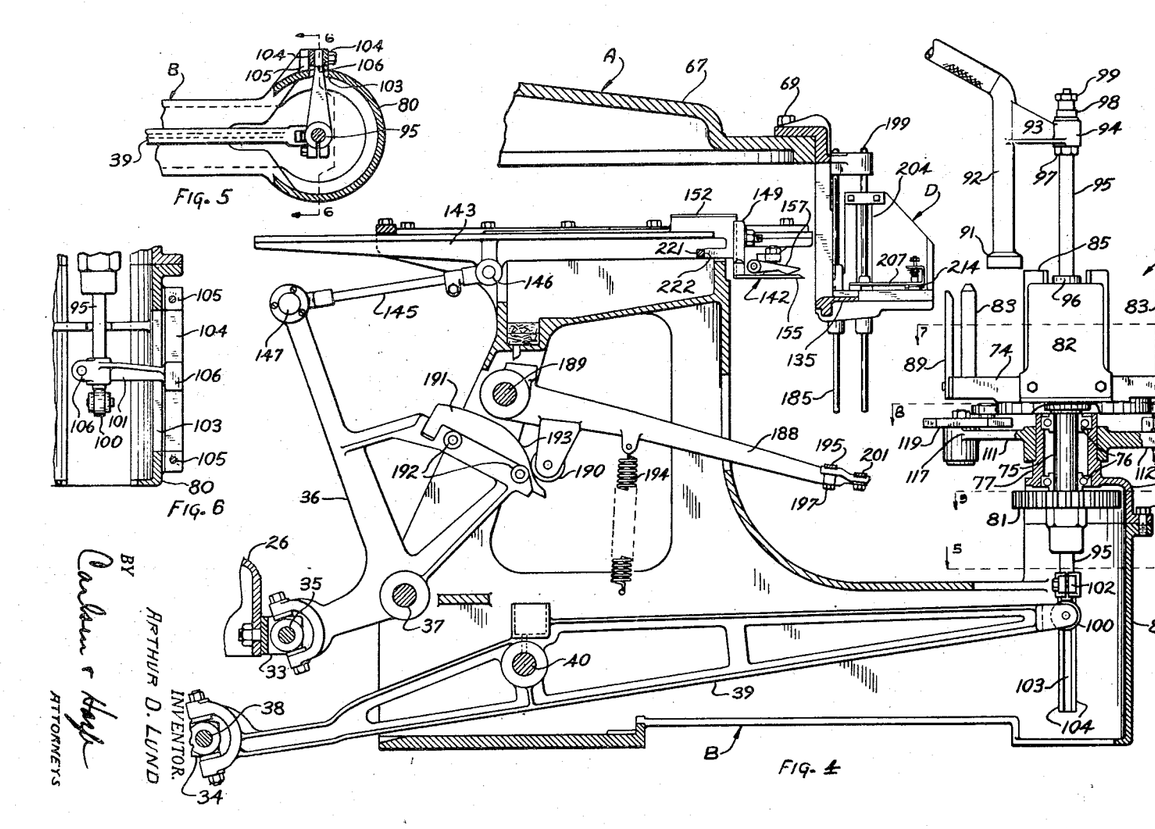
Fig. 4 is an enlarged detail view partially in section and partially in side elevation of one stack holding station, one of the receiving units and associated operating mechanism.
Fig. 5 is a detail horizontal sectional view along the line 5—5 in Fig. 4.
Fig. 6 is a fragmentary vertical cross section along the line 6—6 in Fig. 5.

Plates, and separators, are transferred from the stations C to the collecting shelves 135 by picker or transfer mechanisms each comprising a picker head 142 which is supported at the forward or outer end of a slide 143 carried in slideways or channels 144 formed in the upper edges of the frames B beneath the turret plate 67. This slide 143 is moved inward and outward in radial directions by a link 145 which is pivotally connected at one end to the underside of the slide at 146 and at its other end is pivoted at 147 to the upper end of the bell-crank lever 36. The arrangement is such that upward movement of the hub 26, by the cam means previously described, will swing the upper end of the bell-crank lever outward to project the picker head 142 outward through the opening 138 in the shelf back wall 137, and out over the shelf as seen in Fig. 12. Return movement of the hub 26 will draw back the picker head beyond the position of Fig. 13 until it will clear the collecting unit D, as seen in Figs. 1 and 4.

The picker heads 142 each comprise an L-shaped body or frame 148 having an upstanding back or tang portion 149 grooved at its rear or inner face at 150 to fit the vertical end face 151 of an end or head casting 152 secured to the forward or outer end of the slide 143. A stud bolt 153 projects from the face 151 through the tang 149 and a nut 154 on the stud is used to lock the frame 148 to the slide. Secured to the underside of the frame 148 and projecting outwardly therefrom is a bottom plate 155, mounted by screws 156, and above this plate, at each side there is a picker dog 157 pivoted at 158 on the sides of the frame 148. The dogs 157 extend forwardly over the plate 155 and at their free ends are urged downwardly toward and against the plate by an expansion coil spring 159 which at its upper end bears against an adjustment screw 160, carried by a lug 161 on the frame, and at its lower end bears against a transverse equalizing bar 162 the ends of which have trunnions 163 (Fig. 14) loosely engaging sockets 164 in the inner sides of the dogs. The free, outer ends of the dogs 157 are beveled upwardly and forwardly as at 165 so that a plate or separator may be readily slipped inwardly under the dogs and held flat against and upon the plate 155 by the spring tension on the dogs. Also for this purpose of guiding a plate into the picker the forward or outer edge portion of the plate 155 is beveled off downwardly and outwardly as indicated at 166.

Figure 1:
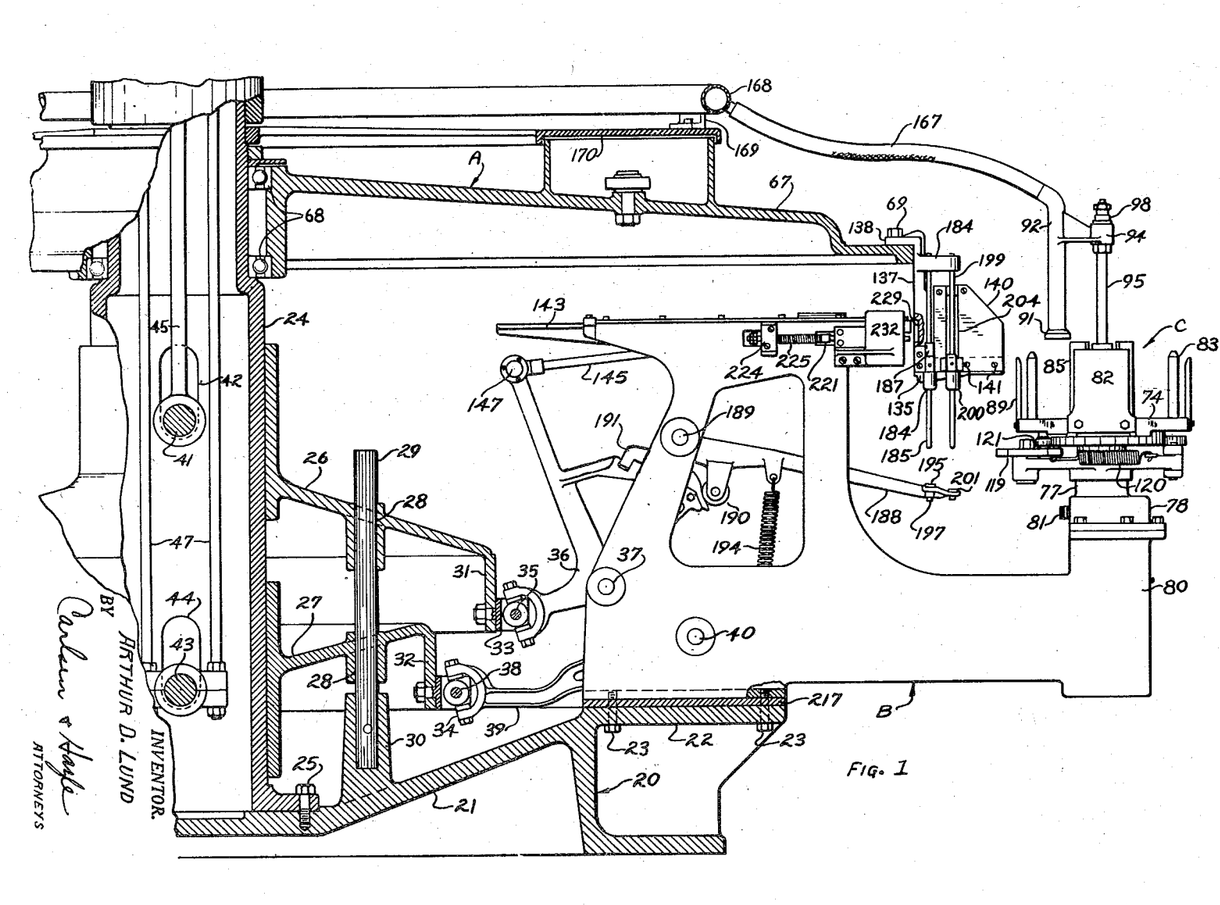
Fig. 1 is a fragmentary, vertical and radial sectional view, partially in elevation, through a machine embodying my present invention.
Figures 2, 3:
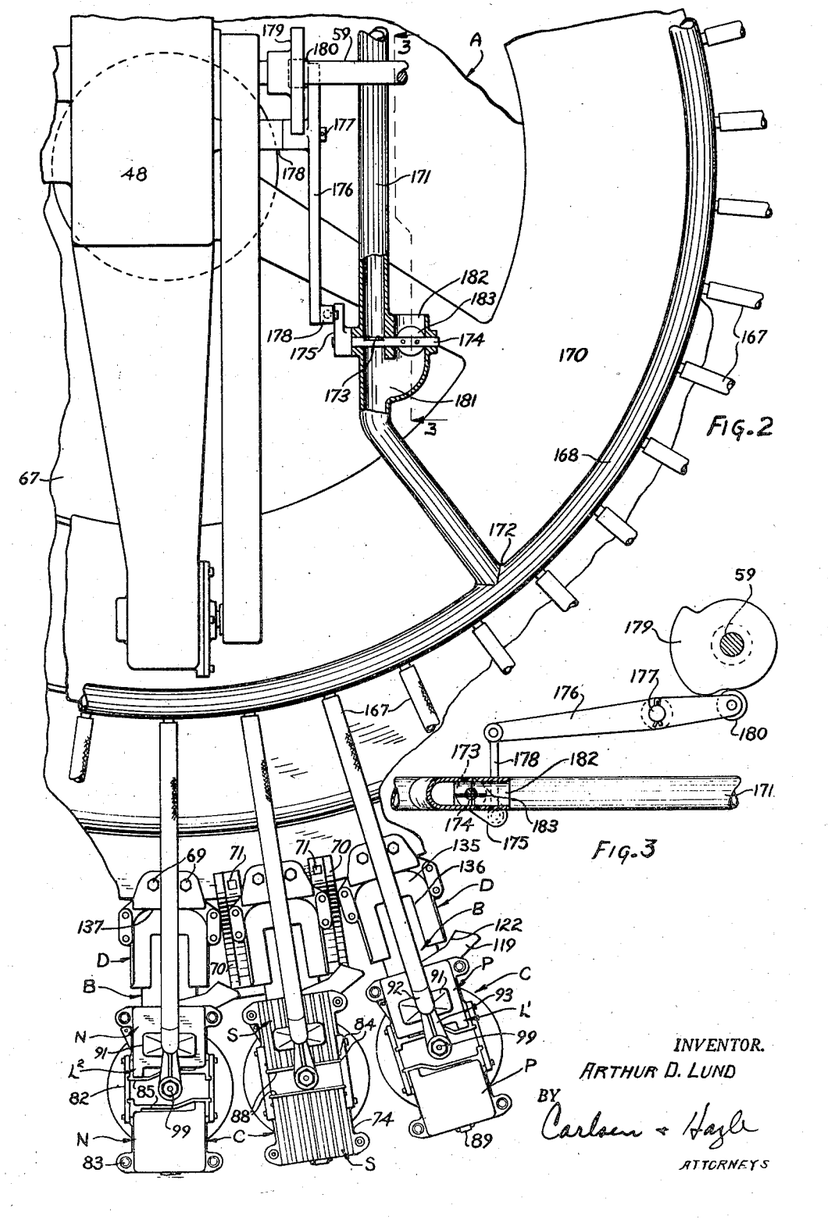
Fig. 2 is a fragmentary plan view of the machine as shown in Fig. 1.
Fig. 3 is a sectional detail view along the line 3—3 in Fig. 2.

Referring at this point particularly to Figs. 1, 2 and 3 it will be noted that the upper end of the tubes 92 leading to the suction heads 91 are each connected by flexible tube 167 to a stationary circular suction manifold 168 which is supported above the turret plate 67, as by means of brackets one of which appears at 169 in Fig. 1 secured atop the stationary cover 170 for the turret rotating mechanism. Connection is made from a suitable pump or source (not shown) to a pipe 171 to set up a continuous suction or vacuum in this pipe and the pipe is connected to the manifold 168 as designated at 172. Interposed in the pipe 171, however, is a butterfly or throttle valve 173 supported by a journaled shaft 174 and exteriorly of the pipe this shaft carries a crank arm 175. A lever 176 is fulcrumed intermediate its ends upon a boss 177 on one side of the housing 48 and one end of this lever is connected by a link 178 to the crank arm 175. The other end of the lever 176 extends beneath the cam shaft 59 which projects from the housing 48 at this side and upon this shaft is a cam 179 which cooperates with a roller 180 upon the lever. Rotation of the cam shaft 59 and cam 179 will, as readily apparent, oscillate the lever 176 to swing the crank arm 175 and alternately open and close the valve 173.

The pipe 171 also has a lateral opening 181 leading to an outlet 183 to atmosphere and the shaft 174 passes through this outlet and carries therein another butterfly or throttle valve 183. The two valves 173 and 183 are disposed at right angles to each other so that as either opens the other will close, and thus the action of the cam 179 will alternately connect the manifold 168, and of course all of the suction heads 91, to the suction source and to atmosphere.

At this point the operation of the machine as thus far described will be set forth. It is understood that the stations C are initially supplied in their inner hoppers or magazines with stacks of negative and positive plates and separators in proper order entirely around the machine, or as far as necessary in order to assemble a group having a desired number of plates. These stacks are turned toward the collecting units D by properly positioning the turret base plates 74 upon which the stacks are placed.

Assuming the collecting shelves all to be empty, the machine when set in operation moves each shelf, or collecting unit past the stations in order, halting the shelf adjacent each station by action of the turret rotating mechanism as pointed out in my prior patent. As a shelf or collecting unit comes to rest thus adjacent a station the actions now to be described then take place. The cams 65 and 66 raise the hub 27 and the walking beam lever 39 at that station is lowered at its outer end so that the lifter rod 95 descends and the suction head 91 drops down upon the stack of plates into contact with the uppermost one thereof. As the stack is depleted the suction head will, of course, drop further each time and always will reach the uppermost plate left in the stack. As the suction head 91 drops the cam 179 opens the valve 173, and closes the valve 183, and suction is applied from the manifold 168 to the suction head. The cams 65 and 66 now return the hub 26 toward starting position and the outer end of the walking beam lever 39 rises forcing the lifter rod 95 upward and lifting the suction head 91. The suction holds a plate upon the suction head as the plate is carried upwardly from the stack but the cams 65 and 66 are so shaped that the plate is raised (Fig. 12) only far enough so that it is slightly above the level of the finger 89 and remains in contact with the back plate 85. During the foregoing operations the cams 58 and 60 have been lifting the hub 26 and the picker slide 143 has been moving outwardly or forwardly through the action of the bell-crank lever 36. As the plate is lifted to the aforesaid postion and there held by the suction head 91 the picker head 142 has been projected over the shelf bottom 135 and is in such position that, as the slide 143 continues to move outwardly, the plate 155 will slip beneath the plate and the dogs 157 will slip over the upper surface of the plate until the plate is firmly gripped at its inner edge by the picker unit as clearly shown in Fig. 12. It will be apparent that the plate is so held by its engagement with the back plate 85 of the magazine that the picker head may slip over the plate without twisting it or getting it out of square with the stack and will straighten it against end plate 85.

As the picker head thus secures its grasp upon the plate the cam 179 moves to a position at which it closes the valve 173 and opens the valve 183, and air being thus admitted to the suction head 91, it releases its grip upon the plate. At the same time the cams 65 and 66 complete the downward movement of the hub 27 and the suction head now released from the plate is raised further to its starting position (Fig. 1) above and clear of the supply magazines.

Now the cams 58 and 60 cause the hub 26 to lower toward starting position and the bell-crank lever 36 moves the picker slide 143 inwardly so that the picker head 142 carries its plate inwardly over the shelf 135. As the plate reaches the back 137 of the shelf the plate edge will strike the sides of the opening 139 (except as will be presently described) and as the picker head continues its inward travel toward its starting position, inwardly clear of the shelf, the plate will be stripped from between the base plate 155 and dogs 157 and will drop onto the shelf bottom 135.

This completes the action at one supply station and the collecting unit then moves to the next stations in sequence where the action is repeated until the collecting unit has received plates and separators from all of the supply stations previously stacked. Of course, the foregoing actions take place simultaneously at all stations so that groups of plates and separators are collected at each collecting unit D, and as these groups are completed they are removed by the operator, or a suitable conveyor, to clear the collecting units for new groups.

The travel of the collecting units past all of the supply stations exhausts the inner magazines of plates and separators and the stations are each thus turned about in sequence once during each complete revolution of the main turret. This moves the exhausted magazines outwardly for restocking and positions the previously outer or inactive magazines, which are continuously being restacked by an attendant, inwardly so that fresh stacks are available for grouping.

This movement of the turret-like supply stations is accomplished by the mechanism 73. As this mechanism passes each station the roller 123, as previously described, unlatches the turret of the supply station and the rack 125 then turns the base plate 74 a half turn placing the filled magazine at the inner side ready for the collecting unit to take plates therefrom. The importance of the index roller 115 is readily apparent since the latch roller 121 is released by the latch 119 for a moment prior to the time that the rack 125 engages the gear 81 and without the index roller to hold the turret it might swing about slightly so that the rack would not properly mesh and a jam would then occur.

The two-magazine supply stations are necessary since the plates are taken from the tops of the stacks and the stacks cannot be replenished while the plates are being transferred.

As pointed out hereinbefore the separators S are stacked in the collecting units with their edges projecting from the bottom edges of the plates P and N and for the purpose of thus assembling the groups I provide plate stop means which operates to stop the plates as they are carried inwardly over the shelf 135 before they reach the back 137 thereof, while allowing the separators to move clear in against the shelf back. Referring to Figs. 1, 11, 12 and 13 where this stop means best appears, it will be noted that I provide on the sides of the shelf back 137 upper and lower apertured lugs 184 in which, at each side of the shelf, I slidably mount vertical stop rods 185. The sides 140 of the shelf are spaced forwardly of the back 137 forming upright slots 186 inwardly of the rods 185 and projecting inwardly through these slots and secured to or formed on the rods are stop fingers 187. These stop fingers 187 project forwardly from the back 137 into the path of plates being brought into the collecting unit by the picker head 142 and normally and of their own weight the rods 185 rest with the stop fingers against the shelf bottom 135.

Cooperating with the vertically movable stop rods 185 at each station is an actuating lever 188 which, as best seen in Fig. 4, is pivoted at 189 to the frame B and has a follower roller 190 engaging a cam member 191 secured at 192 to the bell-crank lever 36. The cam surface 193 of the cam 191 is eccentric to the pivot 37 of the bell-crank lever in such manner that, as this lever swings outwardly to project the picker slide 143 through the collecting unit and pick off a plate, the actuating lever 188 is swung upwardly at its outer end in a plane between the depending ends of the rods 185. Actually the lever 188 is swung upwardly and held, by the shape of the cam 191, until the picker head 142 drops the plate onto the shelf, as previously described. The lever 188 is biased downwardly by a spring 194 to hold the roller 190 in engagement with the cam.

At each station where separators S are being handled, the actuating lever 188 is equipped with a cross bar 195 mounted in a notch 196 by a bolt 197 and the ends of this bar are adapted to upwardly contact the lower ends of the stop rods 185. Thus as these stations, as a separator S is pulled onto the collecting shelf by the picker head 142, the cross bar 195 will raise the stop rods 185 and the stop fingers 187 will be lifted clear of the path of the separator so that it will come to rest with its bottom edge back against the shelf back 137. After the picker head drops the separator the downward movement of the actuating lever 188 will allow the rods 185 to descend and the stop fingers 187 will come to rest on the separator just placed on the shelf. Since a cross bar 195 is not used at the next plate station the stop fingers 187 will not be lifted and will engage and halt the inward movement of the plate short of the back 137 thus leaving the separator extended beyond the plate. At the next separator station the stops will again be raised and it will be readily apparent that, once the cross bars 195 are fitted to the levers 188 at each separator station no adjustment will be necessary thereafter. It will further be noted that as the stop fingers 187 successively come to rest upon the separators the rods 185 will gradually ascend as seen in the dotted lines in Fig. 13, but the actuating levers will always raise the rods to the same height, enough to accommodate the highest plate groups regardless of the varying gaps between the lower ends of the rods and the respective cross bars 195.

Figure 13:
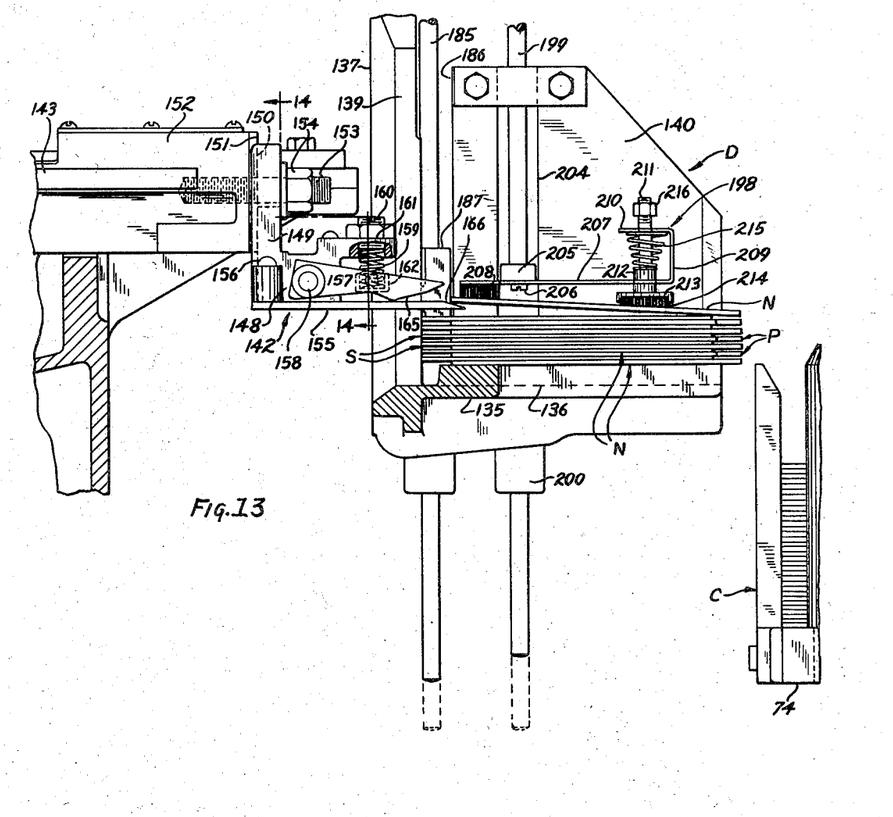
Fig. 13 is an enlarged vertical sectional view through one receiving unit and adjacent parts, showing the transfer mechanism just as it deposits a plate on the accumulating group of plates and separators.

It is, of course, extremely desirable that the plates and separators be evenly stacked in the collecting units so that the plate lugs are all even ready for burning the straps thereto. Referring particularly to Fig. 13, it will be apparent that when the picker head 142 drops the rear edge of the plate N it, due to the angle at which the plate momentarily stands, will have a tendency to slip forward or outward a short distance instead of dropping straight down. To counteract this, I provide a presser mechanism indicated generally at 198 comprising presser rods 199 slidably mounted vertically alongside each shelf in the upper lug 184 and a suitably located lower lug 200 in the side of shelf 135.

The rods 199 are parallel to and disposed outwardly or forwardly of the stop rods 185 and depend from the shelf into position for actuation in the same manner by cross bars 201 secured in notches 202 by bolts 203 to the extremities of the actuating levers 188. Unlike the cross bars 195, however, the cross bars 201 are provided on each actuating lever 188 so that at each unit D the presser rods 199 will be raised as the picker head moves outwardly and then lowered as the plate moves into and over the shelf.

The side plates 140 are vertically slotted as at 204 inwardly of each presser rod 199 and an attaching lug 205 is secured to each rod and extended inwardly through the adjacent slot. To the inner end of each lug 205 I then mount, by a screw 206, the rear end portion of a strap 207 to the underside of which, rearwardly of the lug, is riveted, vulcanized or otherwise suitably fastened a pad 208 of soft rubber or other yieldable, resilient material. Outwardly or forwardly some distance from the lug 205 each strap 207 is turned first upwardly at 209 and then back on itself at 210 and is apertured at points in vertical alignment to loosely slidably receive a screw 211. The screw has a head 212 formed with a plate 213 to the underside of which is attached another soft resilient pad 214. A light expansion coil spring 215 is braced between the screw head 212 and the upper strap end 210 and normally urges the screw 211 and pad 214 downwardly, this motion being limited by a nut 216 on the upper end of the screw.

In the operation of this presser mechanism it will first be understood that the upward movement of the rods 199 will carry the strap 207 and its attached pads 208 and 214 upwardly into the clear when a plate or separator is being drawn in by the picker head 142. As the plate is about to be released, however, the timing is such that the rods 199 will lower and be released by the lever 188 and as this occurs the pad 214 will first come to rest upon the outer edge portion of the plate followed by the pad 208, as will be clearly understood in Fig. 13. The pad 214 will, of course, touch the plate first but as the rods 199 continue to descend the springs 215 will be compressed allowing the parts to settle further while the pad 214 maintains a gentle, non-slipping grip upon the plate. Now as the picker unit 142 releases the plate the pads 208 and 214 will cause the plate to dig straight down onto the stack and will effectively prevent any outward slipping or displacement of the plate, as will be clearly apparent.

It is, of course, necessary that the picker units 142 operate at progressively higher levels around the machine to accommodate the increasing heights of the accumulating plate groups, just as was pointed out in my prior patent and I accordingly in the same manner provide shims 217 (Fig. 1) between the frames B and the rim 22 of the turret frame. By using shims of graduated height each frame B may be vertically offset with respect to the next for this purpose. The vertical width of the rack 125 and roller 123 previously described is to compensate for the difference in level around the machine.

Figure 14:
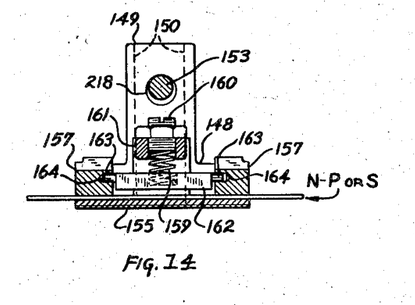
Fig. 14 is a detail sectional view, taken substantially along the line 14—14 in Fig. 13.
Figure 15:
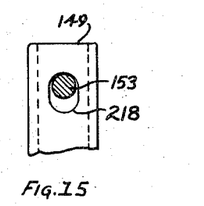
Figs. 15 and 16 are similar detail views like the upper portion of Fig. 14 and illustrating certain adjustment features of my machine.
Figure 16:
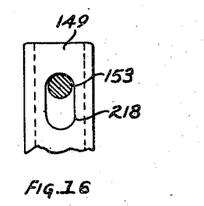

In addition I also here provide separate means for making stepped adjustments of the picker heads 142, with reference to its slides 143, and of the suction heads 91 around the machine in order to readily accommodate plates and separators of oversize thickness, or plates thicker than ordinary. Referring first to Figs. 14, 15 and 16, I show the tangs 149 of the picker units as provided with vertically elongated openings 218 of several lengths, to accommodate the bolts 153 by which the units are attached to the picker slide head 152. Actually the openings will increase in length around the machine in even steps of, say, 1/64 of an inch from the shortest to the longest. Thus by merely loosening the nuts 154 and raising the picker units 142 up as far as possible and then resetting the nuts, the pickers will be all adjusted to a higher level to properly feed to the higher stacks of the thicker plates.

To then raise the suction heads 91 into registry with the thus higher than usual picker heads, the washers 98 above the collars 94 are removed and replaced below the collars against the stop nuts 98; and these washers are graduated in thickness by the same degree around the machine so that the suction heads will be re-registered with the pickers.

I also provide a safety device upon the picker mechanism which comprises (Fig. 11) a square slide bar 219 slidably supported, parallel with and alongside the slide 143, in a channel 220 formed in the upper part of each frame B. Secured to the inner end of the slide bar 219 is a finger 221 extending inwardly in the path of a shoulder 222 on the slide 143, and extending rearwardly from the bar is a stem 223 which is mounted slidably in a lug 224 on the frame. An expansion coil spring 225 is provided on the stem 223, braced between the finger 221 and lug 224, and biases the bar 219 outwardly or forwardly. Such motion of the slide bar, under influence of the spring 225, is limited by stop nuts 226 on the stem 223, as clearly shown. The arrangement is such that when the picker slide 143 is drawn inward in its normal or starting position the shoulder 222 will engage the finger 221 and force the slide bar 219 inward holding the spring 225 under compression, but as the picker slide moves forwardly or outwardly through its working stroke the shoulder will release the finger 221 and the spring 225 will urge the slide bar outwardly to the position shown in Fig. 11.

In the outer or forward end of the slide bar 219 a trigger 227 is pivoted at 228 and it has a projection adapted, when the bar is moved outward as just described, to rest in a notch 229 in the adjacent rear or inner upright face of the shelf back 137. Normally the trigger 227 is held parallel with the bar 219 by a spring 230. However, with the parts in this position, should the turret for any reason start to move ahead carrying the shelf along (upwardly as viewed in Fig. 11) the edge of the notch 229 will swing the trigger 227 counterclockwise about its pivot 228 and the inner end of the trigger will move out from the bar 219 in a direction opposite to the turret movement. When the trigger 227 is thus moved its end will contact and engage and actuate a switch 231 carried by a bracket 232 on the frame. This switch is wired so that when so actuated, it will stop the motor operating the turret and thus before damage would occur to the picker mechanisms in the way of the collecting units the turret will be stopped until the trouble is corrected.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A battery plate assembling machine, comprising a series of stations adapted to respectively contain stacks of grid plates and separator plates, a receiving support intermittently movable in a path adjacent the stations, means associated with each station for lifting one plate from a stack thereon, as the receiving support momentarily stops adjacent a station, means for transferring the lifted plate onto said support, each station having separate magazines for plate stacks, the said magazines being movable to position the stacks in succession under the plate lifting means, and means operative by movement of the receiving support for moving the magazines at each station in succession.

2. A battery plate assembling machine, comprising a main turret having a plurality of plate collecting units, a series of supply stations arranged in a circular path about the main turret, each supply station having a turret and separate magazines thereon for supporting stacks of plates with one of said stacks disposed inwardly toward said main turret, means at each station for successively lifting plates from the top of the inner stack, means for transferring the lifted plates to said collecting units, and means operated by the main turret for periodically rotating the stack supporting turrets to position the plate stacks thereon in succession beneath said lifting means.

3. In a battery plate assembling machine, a main turret having a series of plate supports, a series of supply stations arranged about the turret, means for rotating the turret to register the supports successively with said stations, each station including a rotary turret having magazines for containing separate stacks of battery plates, latch means normally holding the station turrets in positions placing one of the plate stacks thereon inwardly adjacent the path of the supports, means for removing plates from the inner stacks in succession, means for transferring plates from said removing means to the supports, means operated by the main turret for unlatching the station turrets and then moving them to bring other of the plate stacks thereon into oprative relationship with the plate removing and transferring means, and index means operative to accurately register the plate stacks on the station turrets with the plate removing and transferring means.

4. In a battery plate assembling machine, a rotary main turret having at least one plate holder, a supply station arranged adjacent the path of the holder, said supply station having a rotary support adapted to support separate stacks of battery plates, means for transferring plates from one stack at a time to the holder, means operated by the main turret for periodically turning said rotary support to successively place the plate stacks thereon in operative position with respect to said transferring means, latch means normally locking the rotary support, means operated by the main turret for unlatching the support before it is turned, and index means for holding the support in position during the time it is unlatched and before it is turned by said main turret.

5. In a battery plate assembling machine, a supply station and a collecting unit, the said supply station having means to support a stack of plates and said means including an end member engaging one end of the plate stack, means for lifting one plate at a time from the stack to a point above the stack but still in contact with said end member, means for grasping an edge portion of the lifted plate and transferring it to the collecting unit, and said end member operating as an abutment against which the transferring means may straighten the plate as it is grasped and taken from said lifting means.

6. In a battery plate grouping machine, a support for a stack of plates, a receiving support, a picker mechanism operative to engage a plate from the stack and draw it over the receiving support and drop it thereonto, and a presser mechanism having pads to operatively bear downwardly upon the plate as it is released from the picker mechanism and force the plate to drop onto the support without sliding movement relative thereto, one of said pads being resiliently supported to yieldably bear on the plate.

7. In a battery plate grouping machine, a support for a stack of plates, a receiving support having an open side facing the stack, a picker operative to engage a plate from the stack and draw it through said open side and finally drop the plate onto the receiving support, a presser mechanism having pads adapted to contact the plate prior to its being dropped and to guide it downwardly while preventing it from sliding toward the open side of said support, and the said presser mechanism being movable upwardly to clear the path of the picker and then downwardly to bring the pads to bear on the plate after it has entered the support.

8. In a battery plate assembling machine, a plate receiving device, means for feeding positive grid plates to said device, means for feeding negative grid plates to said device and means for feeding separator plates to said device, means for operating said feed means so that the several plates are fed edgewise in succession into said receiving device in the order in which said plates appear in a battery, vertically movable stop means normally adapted to rest upon the plates as they accumulate in said device and in such position to limit the movement of the next plate into the device, and means for selectively raising said stop means clear of the path of certain of the plates as they enter the device and to thereby offset said plates with respect to other plates in the device.

9. In a battery plate assembling machine, a series of rotary supply stations, a motor operated intermittently rotating turret, a series of receiving stations on the turret, means operated by the turret for rotating the supply stations, safety devices operative in conjunction with said supply station rotating means to halt the turret upon a malfunction of said means, transfer mechanisms operative to transfer a plate from each supply station to each receiving station when the turret stops with the stations in proper registry, and a second series of safety devices operative in conjunction with said transfer mechanisms to stop the turret should it start to rotate before the transfer mechanisms complete their operation at each stop.

10. In a battery plate assembling machine, a base, an annular series of plate supply stations supported by the base, a standard extending upwardly from the base, a turret rotatably supported by the standard, a series of receiving stations carried by the turret, a hub member slidably mounted on the standard, lifting means operated by movement of the hub member for lifting plates from the supply stations, a second hub member mounted on the standard, and transfer mechanisms operated by movements of the second hub member for transferring plates from said lifting means to the receiving stations.

11. A battery plate assembling machine, comprising a main turret having a plurality of plate collecting units, a series of supply stations arranged in a circular path about the main turret, each supply station having a turret and separate magazines thereon for supporting stacks of plates with one of said stacks disposed inwardly toward said main turret, means at each station for successively lifting plates from the top of the inner stack, means for transferring the lifted plates to said collecting units, and means operated by the main turret for rotating each supply station turret a part turn once during each complete revolution of the main turret to thereby position the plate stacks in succession beneath said lifting means.

12. In a battery plate assembling machine, a main turret having a series of plate supports, a series of supply stations arranged about the turret, means for rotating the turret to register the supports successively with said stations, each station including a rotary turret having magazines for containing separate stacks of battery plates, latch means normally holding the station turrets in positions placing one of the plate stacks thereon inwardly adjacent the path of the supports, means for removing plates from the inner stacks in succession, means for transferring plates from said removing means to the supports, means operated by the main turret for unlatching the station turrets, means also operated by the main turret and cooperating with means in the station turrets for turning the latter while they are unlatched to bring other of the plate stacks into operative relationship with the plate removing and transferring means, and index means operative to releasably hold the station turrets in the positions they stand while latched until the respective turning means properly engage to turn the station turrets.

13. In a battery plate assembling machine, a main turret having a series of plate supports, a series of supply stations arranged about the turret, means for rotating the turret to register the supports successively with said station, each station including a rotary turret having magazines for containing separate stacks of battery plates, latch means normally holding the station turrets in positions placing one of the plate stacks thereon inwardly adjacent the path of the supports, means for removing plates from the inner stacks in succession, means for transferring plates from said removing means to the supports, means operated by the main turret for unlatching the station turrets, a gear connected to each station turret, a rack operated by the main turret to mesh with said gears in succession as the corresponding station turrets are unlatched and to thereby turn the station turrets a part turn and bring new plate stacks into position for delivery to the plate supports, and index means at each station turret adapted to releasably hold them while temporarily unlatched in position for proper meshing of the rack with the gears.

14. In a battery plate assembling machine, a main turret having a series of plate supports, a series of supply stations arranged about the turret, means for rotating the turret to register the supports successively with said stations, each station including a rotary turret having magazines for containing separate stacks of battery plates, latch means normally holding the station turrets in positions placing one of the plate stacks thereon inwardly adjacent the path of the supports, means for removing plates from the inner stacks in succession, means for transferring plates from said removing means to the supports, means operated by the main turret for unlatching the station turrets and then moving them to bring other of the plate stacks thereon into operative relationship with the plate removing and transferring means, and safety means operative to halt the movement of the main turret if any one of the station turrets is not in condition for movement by the main turret.

15. In a battery plate assembling machine, a main turret having a series of plate supports, a series of supply stations arranged about the turret, means for rotating the turret to register the supports successively with said stations, each station including a rotary turret having magazines for containing separate stacks of battery plates, latch means normally holding the station turrets in positions placing one of the plate stacks thereon inwardly adjacent the path of the supports, means for removing plates from the inner stacks in succession, means for transferring plates from said removing means to the supports, means operated by the main turret for unlatching the station turrets, a gear connected to each station turret, a rack operated by the main turret to mesh with said gears in succession as the corresponding station turrets are unlatched and to thereby turn the station turrets a part turn and bring new plate stacks into position for delivery to the plate supports, the said rack being yieldably supported for movement in one direction should it fail to mesh with any of said gears, and a safety device operative in response to such movement of the rack to halt the movement of the main turret.

16. In a battery plate assembling machine, a supply station and a collecting unit, the said supply station having means for supporting a stack of plates, means for lifting plates from the top of the stack, means for grasping an edge of a lifted plate and transferring it to the collecting unit, and means on the supply station for engaging the edge of the lifted plate opposite the edge grasped by said transferring means and supporting the plate against the thrust of the transferring means as it grasps the plate from the lifting means.

17. In a battery plate assembling machine, a collecting unit, a supply station adjacent to and facing said collecting unit, said supply station having a magazine including upright means for engaging the four sides of a stack of plates placed therein, means for lifting plates from the stack, the said upright means on the side facing the collecting unit terminating below the level to which the plates are raised by said lifting means, and means for engaging the exposed edges of the lifted plates above said shorter side of the magazine and transferring the plates to the collecting unit.

18. In a battery plate grouping mechanism, a receiving support having an open side, a transfer device operative to draw battery plates one at a time through the open side of the support and to drop the plates onto the support to form a stack of plates, a presser mechanism having pads to engage the plates as they are released from the transfer device, means for lifting the presser mechanism clear of the path of the plates as they enter the support and then lowering the mechanism, and one of said pads being yieldably supported to bear downwardly on the edge of the plate nearest the open side of the support before the other pad reaches the plate on the downward movement of the presser mechanism.

19. In a battery plate assembling machine, a plate receiving device, means for feeding positive grid plates to said device, means for feeding negative grid plates to said device and means for feeding separator plates to said device, means for operating said feed means so that the several plates are fed edgewise in succession into said receiving device in the order on which said plates appear in a battery, gravity actuated stop means movably supported on the receiving device for vertical sliding movement and selectively positionable in the path of certain of the plates as they enter the device and for resting on such other plates for thereby offsetting these plates with respect to other plates in the device, and operating means for successively lifting the stop means as the plates accumulate.

20. In a battery plate assembling machine, a circular series of plate supply stations, a power operated intermittently rotating turret, a circular series of receiving stations on the turret, adapted to move past and halt temporarily in registry with the supply station, means for transferring plates in succession from the supply stations to the receiving stations when the stations are in registry, and safety devices operative by the transferring means to stop the turret should it start to rotate before the plate transfer between stations is completed.

21. A battery plate assembling machine, comprising a series of stations adapted to respectively contain stacks of grid plates and separator plates, a receiving support intermittently movable in a path adjacent the stations, means including suction devices associated with each station for lifting one plate from a stack thereon, as the receiving support momentarily stops adjacent a station, means for transferring the lifted plate onto said support, each station having separate magazines for plate stacks, the said magazines being movable to position the stacks in succession under the plate lifting means, and means operative by movement of the receiving support for moving the magazines at each station in succession.

22. A battery plate assembling machine, comprising a main turret having a plurality of plate collecting units, a series of supply stations arranged in a circular path about the main turret, each supply station having a turret and separate magazines thereon for supporting stacks of plates with one of said stacks disposed inwardly toward said main turret, means including a vertically movable suction device at each station for successively lifting plates from the top of the inner stack, means for transferring the lifted plates to said collecting units, and means operated by the main turret for periodically rotating the stack supporting turrets to position the plate stacks thereon in succession beneath said lifting means.

23. In a battery plate assembling machine, a supply station and a collecting unit, the said supply station having means for supporting a stack of plates, means including an upwardly movable suction device for lifting plates from the top of the stack, means for grasping an edge of a lifted plate when held by the suction device and transferring it therefrom to the collecting unit, and means on the supply station for engaging the edge of the lifted plate opposite the edge grasped by said transferring means and supporting the plate against the thrust of the transferring means as it grasps the plate from the suction device.

ARTHUR D. LUND.

REFERENCES CITED

The following references are of record in the file of this patent:

UNITED STATES PATENTS

| Number | Name | Date |
|---|---|---|
| 297,495 | Campbell | Apr. 22, 1884 |
| 466,719 | Bredenberg | Jan. 5, 1892 |
| 628,829 | Mercer | July 11, 1899 |
| 686,538 | Roberts | Nov. 12, 1901 |
| 796,653 | Horton et al. | Aug. 8, 1905 |
| 993,110 | Russell | May 23, 1911 |
| 1,301,799 | Conran | Apr. 22, 1919 |
| 1,689,760 | Young et al. | Oct. 30, 1928 |
| 1,941,106 | Park | Dec. 26, 1933 |
| 2,165,676 | Rhodes | July 11, 1939 |
| 2,167,045 | Hooper | July 25, 1939 |
| 2,181,356 | Chipman | Nov. 28, 1939 |
| 2,324,523 | Lund | July 20, 1943 |
| 2,338,050 | Nelson | Dec. 28, 1943 |